June 25, 1968 R. GOTTSCHALD 3,389,925
BALL JOINTS, ESPECIALLY FOR STEERING GEARS
Filed Oct. 21, 1965
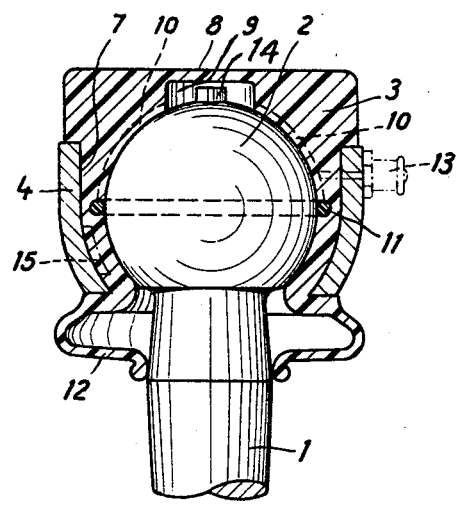
Inventor
RUDOLF GOTTSCHALD
BY
Kenyon & Kenyon
ATTORNEYS United States Patent Office 3,389,925
Patented June 25, 1968

3,389,925
BALL JOINTS, ESPECIALLY FOR
STEERING GEARS
Rudolf Gottschald, Osterath, am Meerbusch, Germany, assignor to A. Ehrenreich & Cie.
Filed Oct. 21, 1965, Ser. No. 500,407
Claims priority, application Germany, Aug. 6, 1965, E 29,857
4 Claims. (Cl. 287—87)

ABSTRACT OF THE DISCLOSURE

The invention relates to a ball and socket joint. Basically, the joint casing of the joint assembly is formed with a spherical cavity to accommodate the ball head of a typical joint pin. In addition, the joint case has a grease chamber located at the uppermost point of the casing extending from and in communication with the ball head cavity. Also included in the design are a plurality of recesses extending from the grease chamber along the cavity surface to the plane of the horizontal center line of the cavity and a nipple mounted on the joint case support ring through which lubricant can be inserted into the grease chamber by way of one of the recesses on the cavity surface. The design also includes provisions for annular inserts of material harder than the joint case material to act as the bearing surfaces for the ball. Rib means extending from the joint ring mounting can also be employed to maintain the joint case in the mounting.

---

My invention relates to a ball joint, preferably in the form of an angular joint, especially for steering gears, in which the head of the joint pin rests in a body of an elastic material which forms the bearing surfaces for the said head and which body, at the same time, forms the joint case, and in which, for receiving the said bearing and case body, a supporting ring is provided which has an opening for the passage of the joint pin which opening is reduced to a size less than the maximum cross section area of the joint pin head, and in which the bearing and case body snaps into the supporting ring when inserted from that side which is not facing the opening for the passage of the joint pin.

The object of the invention is to improve the ball joint of the above type and, mainly, to increase the working reliability of the ball joint while guaranteeing freedom of maintenance over a long period of time.

Substantially with a view to the realisation of the said purpose, the bearing surface of the ball head of the elastic bearing and case body is provided with oil grooves and/or open grease chambers at the side of the bearing surface for the ball head.

According to this feature, the bearing and case body disposes of a supply of lubricants of its own which will be favorable with regard to the continuity of running of the ball joint which running is improved by lubricants, despite of a certain distortion of the bearing and case body towards the ball head.

In the bearing and case body the closed side of the bearing and case body which is not facing the opening for the passage of the joint pin is provided with a grease chamber which is, practically, located at the pole of the ball head and which is open at the ball head side. Providing of a grease chamber at this location results in a favorable distribution of lubricants and is, from reasons of construction, especially practical since, within this area, the bearing and case body has a sufficient strength for the provision of a grease chamber so that any inconvenient increase in dimensioning of the bearing and case body will be avoided.

In this case a pin shaped projection may be provided at the pole of the ball head in a way already known which projects into the grease chamber. The angular movements of the joint pin are limited by the said projection which projects into the grease chamber and which feature guarantees that the joint pin when leaving the bearing and case body in the case of angular deflections of the joint pin does not knock against the bearing and case body. The diameter of the opening for the passage of the joint pin is dimensioned correspondingly. Another advantage is that the angular deflections are elastically intercepted and do not give rise to any impacts.

For a further improvement of the working characteristics of the ball joint it is recommendable to furnish the elastic bearing body with inserts, for instance, of plastic of a harder type, which are in contact with the ball head.

Such inserts may have the form of a ring or belt surrounding the equator of the ball. Such belt or ring limits the elasticity of the joint in the transverse direction in which the stresses affecting the joint or the forces to be transmitted by the joint are mainly acting. The inserts may also have especially favorable gliding qualities.

In the case of the joint according to the invention the gliding and bearing properties of the bearing body which is forming the case are improved by an interior supply of lubricants and/or inserts.

The elastic bearing and case body has preferably a substantially cylindrical outer shape and a peripheral groove by means of which it snaps into the supporting ring.

If the angular deflection of the joint pin is to be greater in one plane than in the other plane, the elastic bearing body is secured against rotation at the supporting ring so that the opening for the passage of the joint pin which is larger in one direction always maintains its position according to the desirable angular deflections.

Still another advantage is given if the bearing body, according to the invention, is provided with a bellows packing for the joint pin which, together with the body, consists of one piece. In this case the elastic bearing and case body and the packing bellows may have different properties. The bellows packing, for instance, may be less rigid than the elastic bearing and case body. Different properties may be obtained, for instance, by a heat treatment. But it will also be possible to obtain the said different properties by spraying material having different properties by means of the same machine. If the bearing body and the packing bellows consist of one piece, this feature is favorable in that, apart from a reduction of material and a decrease in production costs, sealing conditions are improved due to simplified construction and thus operational properties of the joint are improved.

It may even be practical to provide a lubrication nipple or oiler at the supporting ring which nipple or oiler ends in the bearing and case body.

The composite design of this new ball and socket joint includes a polyurethane joint case having a grease chamber arranged in communication with the typical spherical cavity that accommodates the hinge pin ball head and which further includes recessed passages extending from the grease chamber along the cavity surface to the plane of the horizontal center line of the ball head cavity. An additional feature is a lubrication nipple designed to be mounted on the joint case mounting ring and arranged to communicate directly with one of the passages that extends from the grease chamber. The design also includes means for providing the joint case ring with a rib that cooperates with a recess in the joint case to provide additional gripping support in the mounting for the joint case and thereby compensate for large deflections which may impose forces acting to separate the case from the ring.

The drawing is an example of a construction according to the invention and shows a vertical section of a ball joint.

The ball joint has a joint pin 1 with a ball head 2 which is suported in a bearing body 3 of elastic plastics, preferably of polyurethane, and which body, at the same time, forms the joint case. The bearing body has a substantially cylindrical outer shape and is provided with a peripheral groove 7. By means of the said peripheral groove the bearing body snaps into the supporting ring 4 when the body is pressed into the supporting ring. In this case a protection against rotation of the bearing body may be provided in the supporting ring which may, for instance, consist of an inner rib 15 in a longitudinal seam of the supporting ring which engages with a corresponding groove of the bearing body. Such protection against rotation will be practical if the angular deflection of the joint pin is to be greater in one direction than in the other and the opening where the joint pin leaves the bearing body is of a corresponding shape. Before the bearing body is pressed into the supporting ring, the ball head is pressed into the bearing body.

The shell or supporting ring 4 may even be formed directly by a cross guide or supporting lever in which a receiving aperture of a corresponding shape has been provided.

At the closed side 8 of the bearing body a grease chamber 9 is provided at the inside of the bearing body at the pole of the ball head 2. Furthermore, the bearing surface of the bearing body is provided with oil grooves 10. At the equator of the ball the bearing body has an insert 11 contacting the ball head, for instance, in the form of a cylindrical belt or ring of another material, especially of plastics of a more rigid type. The inserts are cast in together with the casting or spraying of the bearing body. They are placed into the mould prior to spraying.

A projection in the form of a pin 14 is provided at the pole of the ball head. The said projection 14 projects into the grease chamber 9 and limits the angular deflections of the joint pin.

A bellows packing 12 for the joint pin is provided at the bearing or case body 3. The packing bellows and the case body 3 consist of one piece. The packing may have other properties than the bearing or case body and may, for instance, be less rigid than the latter. A lubrication nipple or oiler 13 is marked by a line of dots and dashes which nipple ends into the bearing surface of the elastic body 3.

I claim:

1. A ball and socket universal joint comprising;
    an elastic polyurethane joint case having a spherical cavity substantially centrally disposed therein, said spherical cavity terminating at one end in a cylindrical grease chamber cavity circumferentially disposed with respect to the vertical center line of the joint case, a plurality of recesses in the spherical cavity surface extending from the grease chamber to at least the plane of the horizontal center line of the cavity and the major diameter of the ball, a centrally disposed access opening in the base of the joint case which communicates with the spherical cavity, and an annular external recess in said joint case;
    an annular mounting ring for the joint case located in said external recess and having an inner contour identical with the contour of the annular external recess in the joint case;
    a projection from the ball of the hinge pin extending into the grease chamber; and
    a lubrication nipple arranged on the mounting ring with a hollow channel extending therefrom into the joint case and communicating with one of the recesses in the joint case cavity surface.

2. A ball and socket joint as described in claim 1 wherein the wall of the spherical cavity is provided with one annular insert whose inside diameter is coincident with the inside diameter of the spherical cavity and which insert is formed of a material harder than the material of the joint case.

3. A ball and socket joint as described in claim 2 wherein the annular mounting ring is provided with at least one rib extending inwardly and wherein the joint case is provided with a mating recess into which the inner rib can fit whereby the securement of the joint case within the mounting ring is enhanced.

4. A ball and socket joint as described in claim 3 wherein a bellows seal extends from the periphery of the base of the joint case and terminates in an annular opening which surrounds the shaft of the joint hinge pin.

References Cited

UNITED STATES PATENTS

| | | | |
|---|---|---|---|
| 1,300,023 | 4/1919 | Riegel. | |
| 2,424,914 | 7/1947 | Brown. | |
| 2,809,855 | 10/1957 | Booth. | |
| 2,917,334 | 12/1959 | Baker | 287—90 X |
| 2,976,068 | 3/1961 | Jordan. | |
| 3,090,642 | 5/1963 | Gottschald. | |
| 3,101,961 | 8/1963 | White. | |
| 3,250,554 | 5/1966 | Roode | 287—87 |
| 3,250,556 | 5/1966 | Couch et al. | |

FOREIGN PATENTS

| | | |
|---|---|---|
| 1,090,114 | 9/1960 | Germany. |
| 895,068 | 4/1962 | Great Britain. |
| 1,366,571 | 6/1964 | France. |

EDWARD C. ALLEN, *Primary Examiner.*

CARL W. TOMLIN, *Examiner.*

ANDREW KUNDRAT, *Assistant Examiner.*